United States Patent [19]

Nijhuis

[11] Patent Number: 4,571,777
[45] Date of Patent: Feb. 25, 1986

[54] APPARATUS FOR AUTOMATICALLY STUNNING ANIMALS TO BE SLAUGHTERED

[75] Inventor: Johan W. Nijhuis, Winterswijk, Netherlands

[73] Assignee: Machinefabriek G.J. Nijhuis B.V., Netherlands

[21] Appl. No.: 147,826

[22] Filed: May 8, 1980

[51] Int. Cl.⁴ .............................................. A22B 3/00
[52] U.S. Cl. ..................................................... 17/1 E
[58] Field of Search ................................... 17/1 E, 1 A

[56] References Cited

U.S. PATENT DOCUMENTS 1,857,658  5/1932  Pfretzschner ......................... 17/1 E
3,191,220  6/1965  Lunde ..................................... 17/1 A
3,996,644  12/1976  Andersson ......................... 17/1 E X Primary Examiner—Willie G. Abercrombie
Attorney, Agent, or Firm—Arnold, White & Durkee

[57] ABSTRACT

An apparatus is provided for automatically stunning animals to be slaughtered by use of electrodes which pivot about horizontal axes in their initial position, the electrodes extend downwardly into a V-shaped passageway extending between two endless conveyors. Each electrode is biased substantially in its initial position by a spring absorber mechanism, which includes a damper.

3 Claims, 1 Drawing Figure

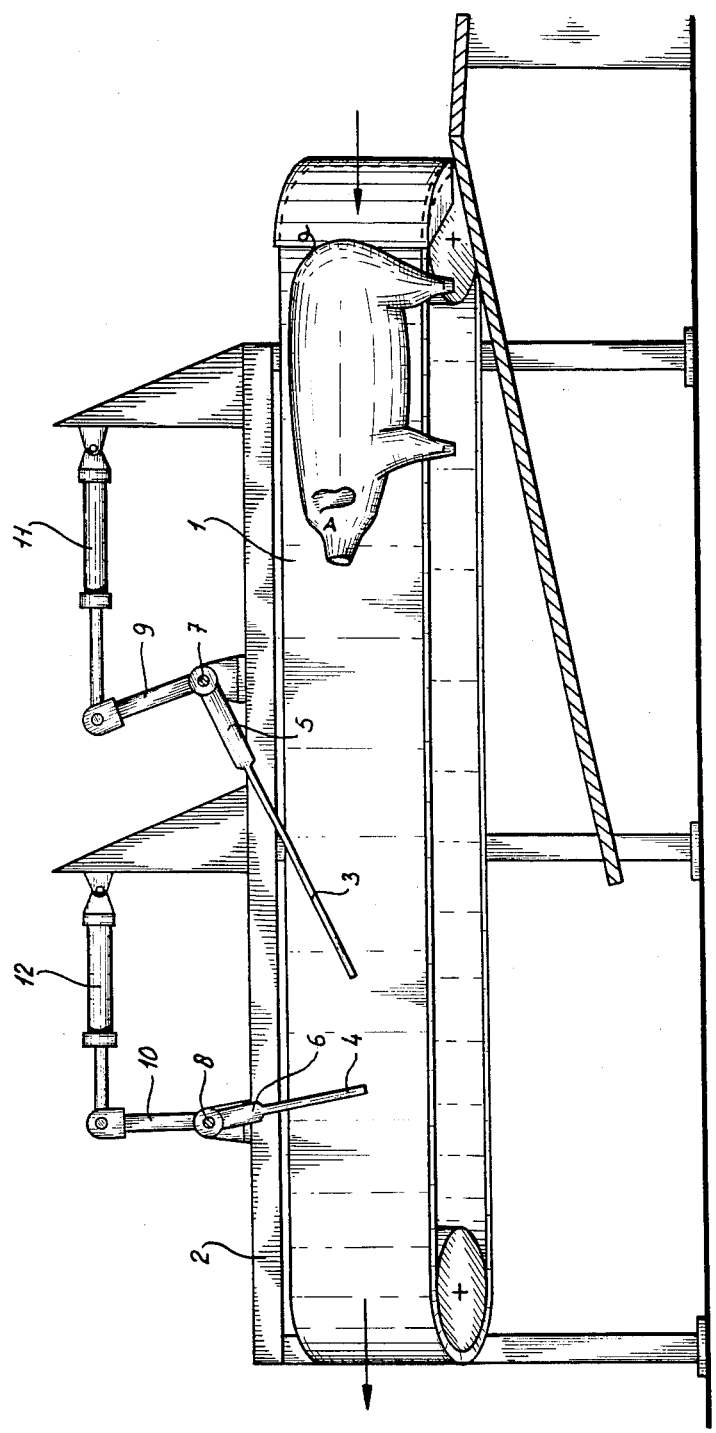

APPARATUS FOR AUTOMATICALLY STUNNING ANIMALS TO BE SLAUGHTERED

CROSS-REFERENCE TO RELATED APPLICATIONS

This application discloses subject matter related to application Ser. No. 299,541, filed Sept. 4, 1981, which is a continuation-in-part of application Ser. No. 202,322, filed Oct. 30, 1980, now abandoned, which is a continuation of application Ser. No. 905,371, filed May 12, 1978, now abandoned; application Ser. No. 147,827, filed May 8, 1980, now U.S. Pat. No. 4,338,700; application Ser. No. 148,033, filed May 8, 1980; application Ser. No. 148,034, filed May 8, 1980, now U.S. Pat. No. 4,319,383; and application Ser. No. 161,298, filed June 20, 1980, now U.S. Pat. No. 4,353,147.

BACKGROUND OF THE INVENTION

The invention relates generally to an apparatus for automatically stunning animals to be slaughtered, such as pigs. More specifically, the invention relates to apparatus comprising a conveyor including two endless conveyor means having operating surfaces facing each other, said operating surfaces forming a substantially V-shaped passageway therebetween, and electrodes arranged in succession in the longitudinal direction of the conveyor, said electrodes being operable to pivot about a horizontal shaft and being adapted to extend to said V-shaped passageway, each electrode being adapted to be kept in its initial position thereof by means of a spring. Typical of such conveyor-type apparatus is that disclosed in application Ser. No. 905,371, which is based upon Dutch Patent Application 77.05519 laid open to public inspection.

In the above apparatus disclosed in Applicant's prior application, the electrodes are pushed upward by the head of the animal to be stunned. The first electrode in the direction of movement runs across the head so that upon engagement with the second electrode a current may be passed through the head of the animal from the front to the back thereof. A proper stunning requires a short jolt of current at a high voltage, which requires a very good contact between the animal's head and the electrodes. During the transportation by the conveyor, the animal tries to evade the electrodes. The animal moves its head whereby additional movements are imparted to said electrodes. It has been found that a proper stunning could not always be achieved by means of the aforementioned apparatus.

SUMMARY OF THE INVENTION

The object of the present invention is to provide a solution for this problem, and, according to the present invention, this object is attained providing a spring with a damper, said damper dampening at least the upward movement of each electrode. The counteracting resistance of the damper is believed to cause the electrodes to maintain good contact with the moving head of the animal. Upon passage of the stunned animal the electrodes will return quickly to their initial downwardly extending position, permitting the distance between successive animals to be kept small in order to achieve a sufficiently high production level in slaughtering. During the return to the initial position the damper's substantially alleviate unwanted movements.

BRIEF DESCRIPTION OF THE DRAWINGS

The invention will now be described in further detail with reference to the drawing, in which FIG. 1 is a diagrammatical side elevation, partially in cross section, of the apparatus in accordance with the present invention.

DESCRIPTION OF A PRESENTLY PREFERRED EMBODIMENT

In FIG. 1 shown is one of two conveyor means 1 which define a V-shaped passageway therebetween. Above said conveyor means there is provided a support frame 2. Electrodes 3 and 4 are suspended from hinge joints. In a presently preferred embodiment, several separately hinged electrode rods of electrodes 3 and 4, respectively, are provided side by side at each position, as disclosed in the cross-referenced application Ser. No. 905,371.

Each one of the electrodes 3 and 4, extends from arms 5 and 6, respectively, said arms being mounted by hinges on shafts 7 and 8, respectively. Arms 5 and 6 cooperate with upward arms 9 and 10, respectively. The upper ends of the arms 9 and 10 are coupled to spring means 11 and 12, respectively. In a presently preferred embodiment, said spring means may comprise a built-in shock absorber, such as those used for motorcycles and mopeds. A separate damper is provided for each electrode in each side by side group. Such absorber springs provide a strong dampening effect upon compression and a lesser degree of dampening upon extension.

The dampers 11 and 12 may be connected to an adjustable pressure accumulator in common for each group.

It is to be understood that the invention will admit of other embodiments. The description of the presently preferred embodiment is given only to facilitate understanding of the invention by those skilled in the art and should not be construed as limiting the invention.

What is claimed is:

1. An apparatus for automatically stunning animals to be slaughtered comprising:
    a conveyor including two endless conveyor means, said conveyor means having operating surfaces facing each other, said operating surfaces forming a substantially V-shaped passageway therebetween; and
    first and second electrodes, said electrodes being operable to pivot about a horizontal shaft, and being adapted to extend downwardly toward said V-shaped passageway, each electrode being further adapted to be kept in its initial position by resilient means, said resilient means being provided with a damper adapted to dampen at least the upward movement of each said electrode to bring the electrode to rest with minimum oscillation.

2. An apparatus for automatically stunning animals to be slaughtered, comprising: a V-shaped conveyor adapted to hold an animal securely during stunning and to transport the animal into contact with stunning electrodes while inhibiting the animal's movement;
    first and second electrodes extending downwardly toward the V-shaped conveyor and operable to pivot about a pivot point, the electrodes having an initial position that the electrodes occupy when no animal is in contact with the electrodes;

at least one of the electrodes having a damper attached to the electrode wherein the damper is adapted to provide a strong dampening effect when an animal compresses the damper as the animal is transported by the V-shaped conveyor into contact with the electrode, and wherein the damper is adapted to provide a lesser dampening effect when the animal is transported beyond the electrode and the damper is allowed to extend toward the electrode's initial position, the damper being adapted to bring the electrode to rest in its initial position with a minimum of oscillation.

3. The apparatus according to claim 2, further comprising a spring, the spring being attached to the electrode having a damper, the spring being adapted to urge the electrode toward its initial position.

* * * * *

UNITED STATES PATENT AND TRADEMARK OFFICE
CERTIFICATE OF CORRECTION

PATENT NO. : 4,571,777
DATED : February 25, 1986
INVENTOR(S) : Johan W. Nijhuis

It is certified that error appears in the above-identified patent and that said Letters Patent is hereby corrected as shown below:

In the ABSTRACT, line 3, change "axes in" to -- axes. In --.

Column 1, line 55, change "this" to -- the above-stated --; line 56, after "attained" insert -- by --.

Signed and Sealed this

Eighth Day of July 1986

[SEAL]

Attest:

DONALD J. QUIGG

Attesting Officer

Commissioner of Patents and Trademarks